United States Patent Office 2,711,102
Patented June 21, 1955

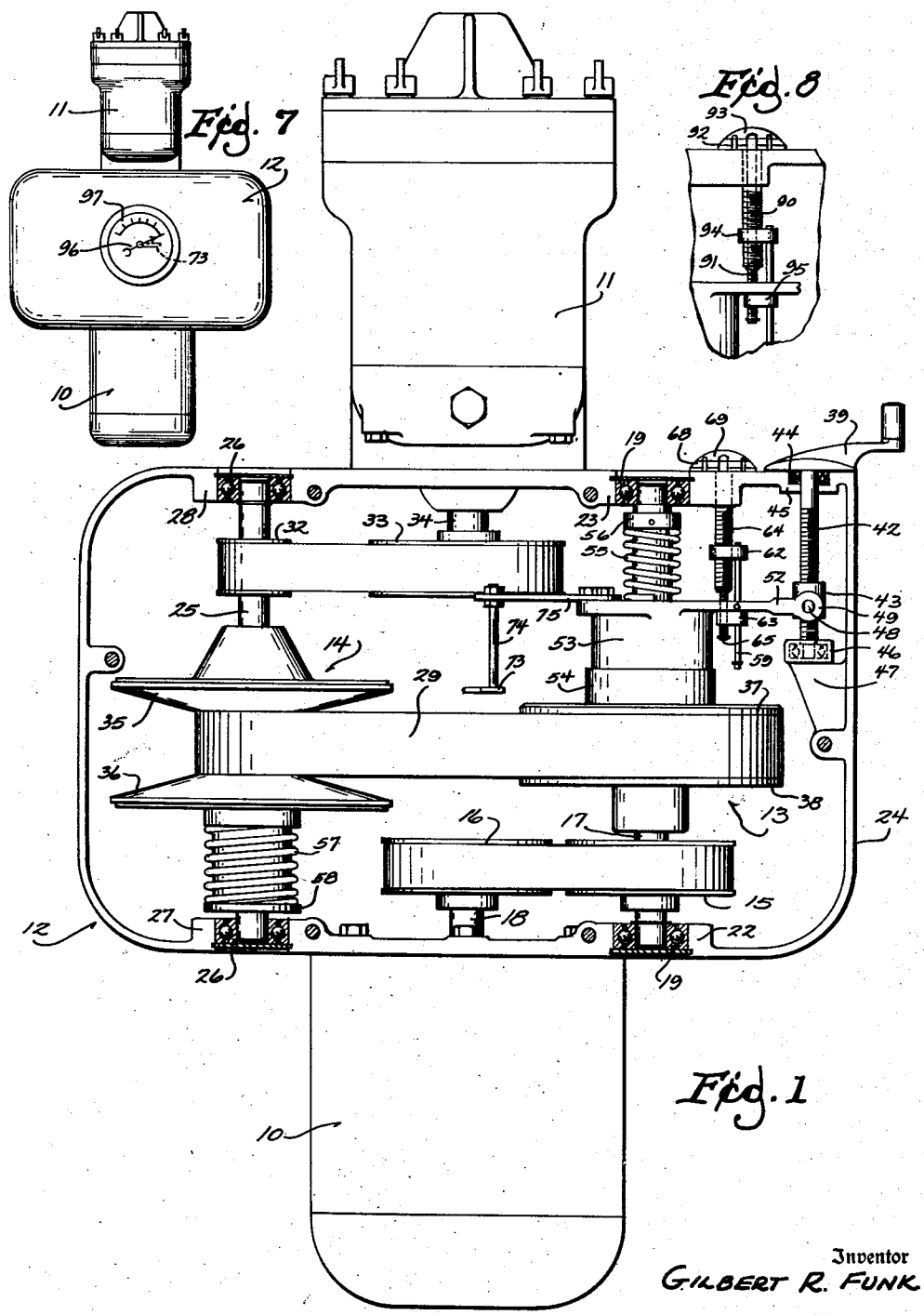

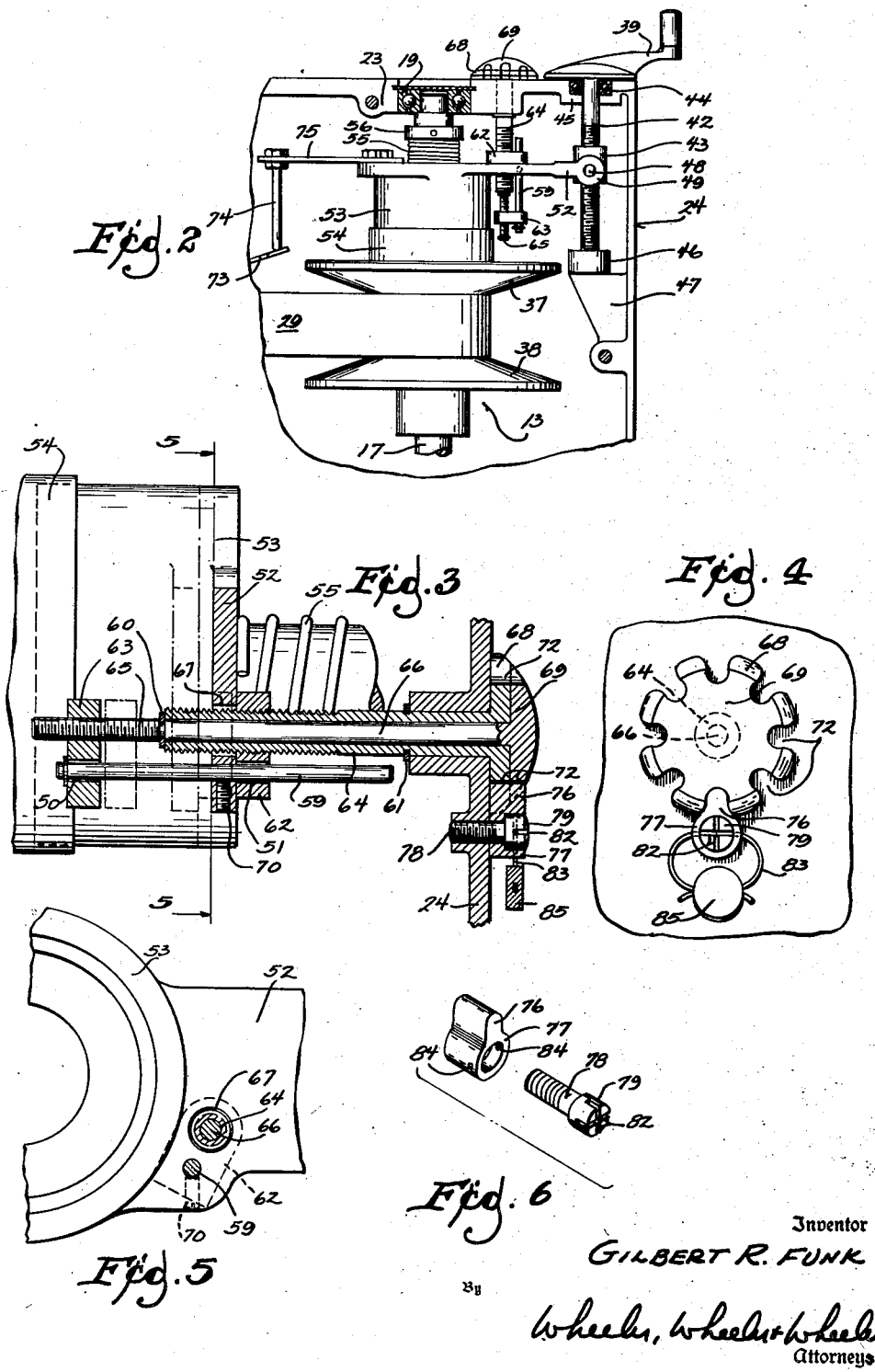

2,711,102

VARIABLE RATIO TRANSMISSION MECHANISM

Gilbert R. Funk, Waukesha, Wis., assignor to Waukesha Foundry Company, Waukesha, Wis., a corporation of Wisconsin Application October 10, 1951, Serial No. 250,765

16 Claims. (Cl. 74—230.17)

This invention relates to a variable ratio transmission mechanism, and more particularly to a ratio limit or stop assembly applicable thereto.

The primary object of the invention is to provide an improved ratio or speed range setting apparatus which is applicable to a variable ratio transmission and which is adapted for ready adjustment and resetting manipulation. In this connection it is an object of the invention to provide a device having control knobs at the outside of the housing of the transmission to facilitate manipulation and change of the stop members on the same axial path within the housing.

In the preferred embodiment of the invention one of said stop members is mounted on an externally threaded tube and the other stop member is mounted upon a coaxial rod or stem having a threaded portion projecting from the tube. Accordingly, independent or concurrent axial rotation of the tube and rod will cause the stop members to be advanced and retracted on their respective threaded mounts whereby to change the limit position assumed by the respective stop members.

A specific object of the invention is to provide for novel means for manipulating the rod and tube and for locking them against manipulation after the apparatus has been set by an authorized person.

Other objects and advantages of the invention will be more apparent to one skilled in the art upon an examination of the following disclosure.

In the drawings:

Fig. 1 is a plan view of a variable ratio transmission mechanism embodying the present invention, the cover thereof having been removed and the end bearings of the respective pulley shafts being shown in section.

Fig. 2 is a fragmentary view on the same scale as Fig. 1, showing a variable ratio pulley in a different position of adjustment from that shown in Fig. 1.

Fig. 3 is an axial cross sectional view taken through the co-axial rod and tube members which mount the respective stop members, other portions of the transmission apparatus being shown fragmentarily.

Fig. 4 is a fragmentary side view of the device shown in Fig. 1 showing the respective stop member adjusting knobs locked against rotation.

Fig. 5 is a cross sectional view taken along the line 5—5 of Fig. 3.

Fig. 6 is a perspective view in spaced apart relation of the socketed dog locking member and its retaining bolt.

Fig. 7 is a plan view on a reduced scale of the device of Fig. 1.

Fig. 8 is a fragmentary view of a modified form of stop control mechanism.

For illustrative purposes a pump 11 is shown as the actuated device driven by a motor 10 through a variable ratio transmission or drive indicated generally by reference character 12. While the general details of the variable ratio transmission mechanism 12 comprise no part of the present invention, its construction and operation will be briefly described. The transmission comprises substantially radially aligned input and output pulleys 13 and 14 respectively. The input pulley 13 receives power from the motor 10 through the belt-connected pulleys 15 and 16 which are respectively mounted on the input pulley shaft 17 and the motor armature shaft 18. The input pulley shaft 17 is preferably mounted at its opposite ends by ball bearings 19 which are journaled in bosses 22 and 23 in the housing 24 of the transmission.

The output pulley 14 is likewise provided with a shaft 25 supported at its opposite ends by ball bearings 26 journaled in the respective bosses 27 and 28 of the housing 24. Input pulley 13 drives output pulley 14 by means of a V or cog belt and output pulley 14 in turn drives pump 11 through radially aligned pulleys 32 and 33 which are respectively mounted on pulley shaft 25 and pump shaft 34. The speed of the pump relative to that of the motor is varied by changing the ratio of the effective diameter of the pulleys 13 and 14. Both pulleys have tapered or conical side flanges which are adjustable as to their mutual spacing whereby to cause the belt 29 to engage the pulleys at a smaller or larger diameter thereof, dependent upon the spacing of the flanges. In Fig. 1 the spacing of the flanges 35 and 36 of pulley 14 is illustrated at or near a maximum, while the flanges 37 and 38 of pulley 13 are shown near their minimum spacing. Accordingly, the drive as shown in Fig. 1 is near its highest speed transmission ratio.

In the fragmentary view of Fig. 2 the spacing of the flanges 37 and 38 of the input pulley 13 is shown near its maximum and the spacing of the flanges 35 and 36 of the output pulley 14 (not shown in Fig. 2) would then be near its minimum. Fig. 2 illustrates a low speed ratio of the transmission.

Speed ratio change and adjustment is effected by means of crank 39 mounted externally of housing 24. Crank 39 turns a threaded shaft 42 which carries in threaded engagement therewith a movable shifting collar 43. The threaded shaft 42 is journaled at both ends, one end being mounted in the ball bearing 44, in boss 45 on the housing 24, and the other end of the shaft 42 being rotatably supported in ball bearing 46, which is mounted on bracket 47 within the housing 24.

Collar 43 is provided with a radially projecting stud 48 which engages an apertured ear 49 of an operator or arm 52. Arm 52 extends to a hub 53 which is desirably integrally formed with the arm. Hub 53 is mounted to be axially movable on shaft 17 and carries in rotatable connection a sleeve 54 splined to shaft 17 and which mounts flange 37 of pulley 13. The hub 53, sleeve 54 and flange 37 are biased by compression spring 55 towards rotatable flange 38 of pulley 13, flange 38 being keyed to shaft 17 to preclude its axial shifting thereon. Spring 55 seats against a collar 56 which transmits the thrust of the spring 55 to the shaft 17 to be balanced by the equal reaction of belt 29 against flange 38.

The flanges 35 and 36 of pulley 14 are likewise mounted for relative axial movement, flange 35 being keyed to shaft 25 and flange 36 being splined to shaft 25 and biased towards flange 35 by compression spring 57 seated against collar 58 which transmits thrust of the spring 57 to the shaft 25 to be balanced by the equal reaction of the belt against flange 35. As is well understood in this art adjustment of the spacing of flanges 37 and 38 of pulley 13 dictates the depth to which the belt 29 will seat. The spacing of the flanges 35 and 36 of pulley 14 is automatically accommodated inversely to the spacing of the flanges 37 and 38 on pulley 13, in accord with the slackening or tautening of belt 29.

Except as limited by the stop assembly mechanism about to be described, manipulation of the crank 39 is effective to widen or narrow the spacing of flanges 37 and 38 of pulley 13 and accordingly change the speed ratio of the transmission throughout the range between the maximum to minimum ratios of which the device is capable. In the present invention, however, a stop assembly which limits the movement of the arm 52, and consequently the spacing of pulley flanges 37 and 38, is provided. This stop assembly comprises axially spaced stop members 62 and 63 which are mounted respectively on an externally threaded tube 64 and the threaded projection 65 of a co-axial rod or stem 66. As best shown in Fig. 3 the rod 66 is co-axial with the tube 64 and is rotatably supported in tube 64 which is in turn supported in the bearing boss 23 of housing 24. Snap ring 61 locks the tube against axial shifting respecting the tube 64. The rod and tube are respectively provided with co-axial knobs 69 and 68 by means of which the tube and rod may be independently or concurrently rotated.

The respective stops 62 and 63 are precluded from turning with the tube 64 and rod 65 by guide bar 59 which is carried by arm 52 and which is slidably engaged in suitable apertures 50 and 51 in stops 63 and 62 respectively. The guide bar 59 is offset from the axis of the stem and tube and is mounted for axial adjustment in the arm 52 by means of a set screw 70. Bar 59 is fixed to arm 52 and hence is usually stationary while the stops are undergoing axial adjustment and requires the stops to move axially when the threaded member on which the stop is mounted is turned. Bar 59 is, however, free to move with arm 52, sliding through the stop apertures.

It is evident that rotation of either one or both tube 64 and rod 65 will serve to advance or retract the respective stop members 62 and 63. In this manner either or both of the upper or lower ratio limits are adjusted.

As best shown in Fig. 5 arm 52 is provided with an aperture 67 which is larger than tube 64 and rod 65 but which is insufficiently large to admit passage of either of the stop members 62 and 63. Accordingly, movement of the arm 52 in its ratio changing range is limited at upper and lower levels by the position of the stop members 62 and 63.

The knobs 68 and 69 which, as illustrated, are desirably at the exterior of housing 24, are not necessarily so. This facilitates concurrent movement and also locking. As best shown in Fig. 4 the knobs 68 and 69 are provided with complementary peripheral notches, indicated collectively as 72, which register when the knobs are aligned. Knob 69 is of lesser radial extent than knob 68, and the notches 72 extend radially inwardly to a smaller radius than that of either knob.

The range for which the transmission has been set is indicated by an indicator pointer 96 mounted on the exterior of case 12. This pointer 96 moves over graduations 97 and is connected through the case to an actuator diagrammatically indicated by reference character 73 in Figs. 1 and 2. The actuator 73 receives motion from a striker rod 74 mounted on arm 75 connected to the hub 53 of arm 52.

After setting the stops 62 and 63 at the desired speed range the knobs 68 and 69 may be locked in set position by a lug or dog 76 which is retractably mounted to enter the registering notches 72 of the respective knobs.

Dog 76 is provided with an offset socketed portion 77 which receives a mounting bolt 78 having a head 79. Head 79 may be cross slotted, as indicated at 82, to receive a wire loop 83 through the diametrically opposite holes 84 in the socket 77 whereby dog 76 may be locked in engagement with the registering notches 72 of the knobs. A lead seal 85 may be applied to the loop 83 in the usual fashion. The locked knobs are best shown in Figs. 3 and 4. Breaking of the seal and unscrewing of bolt 78 from its threaded seat in housing 24 permits removal of dog 76 and manipulation of the knobs.

In Figs. 1 and 2 the threads on tube 64 and rod 65 are pitched in the same direction. Accordingly, if both knobs 68 and 69 are turned concurrently, the stops 62 and 63 will move in the same direction and at a constant spacing. Thus, while the range of adjustment for which the drive was originally set may be maintained constant, the scale is changed. Conversely, in Fig. 8 I show a modification in which the threads on tube 90 and rod 91 are oppositely pitched. Accordingly, when knobs 92 and 93 are concurrently turned, the stops 94 and 95 will move in opposite directions to change the range, the scale remaining the same. In either case concurrent turning of the knobs changes the upper and lower limits defined by the position of the stops.

Although the invention is in no way limited to a variable ratio transmission used to pump milk through a pasteurizer, it has been found to be admirably suited to this purpose. In milk pasteurizing plants it is desirable that the milk be pumped through the pasteurizer in a range of speeds within certain predetermined limits. Higher speeds will result in under-pasteurized milk, while lower speeds result in over-pasteurized milk. Health regulations customarily establish the periods of required exposure of the milk to pasteurization, and health inspectors are authorized to seal pasteurization equipment to produce the required exposure time. In the apparatus herein disclosed the health inspector is able to set upper and lower pumping speed limits, and can seal the mechanism to operate between these set limits. Since all adjustments of the device may be made externally of the housing 24, it is a simple matter for the inspector to change and reset the limits merely by removing the locking dog 76 and adjusting one or both of the knobs 68 and 69, thereby changing the internal axial positions of the stop members 62 and 63. After the adjustment is made the device can be locked against tampering.

I claim:

1. In a variable ratio transmission mechanism of the type comprising pulleys having flanges movable toward and away from each other, and an operator comprising means for varying flange spacing, a stop assembly for confining said operator between limits, said stop assembly comprising normally spaced stop members between which the operator is movable, said stop members being mounted in the path of the operator and having individually controllable adjusting means for positioning said stop members, the mountings upon which the stop members are respectively movable comprising a threaded tube and a rod co-axial with said tube and having a threaded portion projecting from said tube.

2. The device of claim 1 wherein the threads on said tube and rod are pitched in the same direction.

3. The device of claim 1 wherein the threads on said tube and rod are oppositely pitched.

4. The device of claim 1 wherein said operator is further provided with a guide bar, said bar being radially offset from the axis of movement of the stop members and being connected for sliding engagement with said stop members.

5. The device of claim 1 wherein said individually controllable adjusting means comprises knobs respectively connected to said tube and rod.

6. The device of claim 5 wherein said knobs are provided with complementary peripheral notches, and a dog selectively engageable in registering notches of the knobs whereby to lock the knobs in selected relative position.

7. In a device of the character described, the combination with an externally threaded tube and a rod co-axial with said tube and freely rotatable therein, first means for resisting axial movement of said rod and tube, said rod being provided with a threaded portion projecting from the tube, a stop member in threaded engagement with the tube, a stop member in threaded engagement with the projecting portion of the rod, and second means for resisting rotation of said stop members whereby rotation of the rod and tube will cause the respective stop members to move upon the same axial path.

8. The device of claim 7 wherein said rod and tube are respectively provided at their ends remote from the stop members with knobs, said knobs having complementary peripheral notches which register whereby to admit a stop dog to lock the respective knobs in selected relative position.

9. The device of claim 7 wherein said second means comprises a common guide rod radially offset from the axial path of said stop members and in slidable engagement with said stop members.

10. In a device of the character described, the combination with stop members, of apparatus for adjusting said stop members, said apparatus comprising adjacent knobs, motion transmitting connections from said knobs to said stop members, said knobs being provided with complementary peripheral notches registrable in selected positions of the stop members, said peripheral notches comprising finger grips for concurrent manipulation of the adjacent knobs as a unit, a dog and means for mounting said dog for retractable movement into registering notches of said knobs to lock said knobs in selected relative position.

11. The device of claim 10 wherein said dog comprises a lug having an offset mounting portion, said offset mounting portion being provided with a socket and a mounting bolt having a head seated in said socket.

12. The device of claim 10 wherein one of said knobs is of lesser radius than the other of said knobs, said complementary notches extending radially inwardly of said knobs to a smaller radius than either of said knobs.

13. A variable ratio transmission mechanism comprising pulleys having flanges movable toward and away from each other, means for adjusting the spacing of the flanges of one of said pulleys comprising a rotatable connection with one of said flanges, said connection including an arm, a crank in motion transmitting connection with said arm whereby to move said arm in the direction of the axis about which the pulley rotates, and a stop assembly for confining said arm between limits, said stop assembly comprising normally spaced stop members between which the arm is movable, said stop members being mounted at opposite sides of the arm in its path of movement and having individually adjusting means for selectively positioning the stop members in the path of movement of the arm, said adjusting means comprising a control knob for each stop member whereby said stop members may be independently manipulated, said control knobs being proximately mounted and having adjacent finger grip portions for concurrent manipulation of both said knobs as a unit.

14. A variable ratio transmission mechanism comprising pulleys having flanges movable toward and away from each other, means for adjusting the spacing of the flanges of one of said pulleys comprising a rotatable connection with one of said flanges, said connection including an arm, a crank in motion transmitting connection with said arm whereby to move said arm in the direction of the axis about which the pulley rotates, and a stop assembly comprising normally spaced stop members between which the arm is movable, said stop members being mounted at opposite sides of the arm in its path of movement and having individually adjusting means for selectively positioning the stop members in the path of movement of the arm, the respective stop members being provided with separate mounting elements, one of said elements comprising an externally threaded tube, and the other of said elements comprising a rod co-axial with the tube and having a threaded portion, said elements being respectively provided with proximate means by which they may be concurrently as well as independently rotated, whereby to adjustably position one or both of said stop members.

15. The device of claim 14 wherein the threads on said tube and rod are pitched in the same direction.

16. The device of claim 14 wherein the threads on said tube and rod are oppositely pitched.

References Cited in the file of this patent

UNITED STATES PATENTS

| Number | Name | Date |
|---|---|---|
| 240,282 | Stevens | Apr. 19, 1881 |
| 955,092 | McGahan | Apr. 12, 1910 |
| 2,065,197 | Reeves | Dec. 22, 1936 |
| 2,158,047 | Weston | May 9, 1939 |
| 2,170,212 | Pfleger | Aug. 22, 1939 |
| 2,224,369 | Reeves | Dec. 10, 1940 |